United States Patent
Sachse et al.

(10) Patent No.: US 7,187,743 B2
(45) Date of Patent: Mar. 6, 2007

(54) FREQUENCY ERROR CORRECTION IN A COMMUNICATION SYSTEM

(75) Inventors: Eric Sachse, Dresden (DE); Jörg Borowski, Dresden (DE); Ingo Kühn, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 760 days.

(21) Appl. No.: 10/324,808

(22) Filed: Dec. 20, 2002

(65) Prior Publication Data

US 2004/0062335 A1    Apr. 1, 2004

(30) Foreign Application Priority Data

Sep. 30, 2002   (DE)   ............................... 102 45 687

(51) Int. Cl.
*H03D 3/24* (2006.01)
(52) U.S. Cl. .................... 375/376; 375/373; 375/327
(58) Field of Classification Search ............... 375/376, 375/327, 373
See application file for complete search history.

(56) References Cited

U.S. PATENT DOCUMENTS

| | | | |
|---|---|---|---|
| 5,594,757 A | 1/1997 | Rohani | |
| 5,774,494 A | 6/1998 | Sawahashi et al. | |
| 5,963,608 A | 10/1999 | Casper et al. | |
| 6,304,582 B1 * | 10/2001 | Zhang et al. | 370/503 |
| 6,549,561 B2 * | 4/2003 | Crawford | 375/137 |
| 6,560,053 B1 * | 5/2003 | Ohta et al. | 360/51 |
| 6,603,801 B1 * | 8/2003 | Andren et al. | 375/147 |
| 6,650,187 B1 * | 11/2003 | Riddle et al. | 331/17 |
| 2002/0101840 A1 * | 8/2002 | Davidsson et al. | 370/330 |

FOREIGN PATENT DOCUMENTS

| | | |
|---|---|---|
| EP | 0734135 | 9/1996 |
| WO | 89/12931 | 12/1989 |

* cited by examiner

*Primary Examiner*—Mohammed Ghayour
*Assistant Examiner*—Juan Alberto Torres
(74) *Attorney, Agent, or Firm*—Meyertons Hood Kivlin Kowert & Goetzel, P.C.; B. Noël Kivlin

(57) ABSTRACT

A technique for performing a frequency error correction process is provided that may be used in receivers of wireless local area network systems. The technique comprises a three-phase process generating a frequency approximation value based on a frequency error estimate, starting a channel estimation process that uses the generated frequency approximation value, refining the generated frequency approximation value, and compensating a frequency error using the refined frequency approximation value. Further, a corresponding integrated circuit chip and an operation method are provided. Using the technique for performing a frequency error correction process may provide high reliability, high precision and improved operation speed.

54 Claims, 9 Drawing Sheets

FREQUENCY ERROR CORRECTION IN A COMMUNICATION SYSTEM

BACKGROUND OF THE INVENTION

1. Field of the Invention

The invention generally relates to a frequency error correction for use in units or subunits of communication systems, and in particular for use in WLAN (Wireless Local Area Network) receivers.

2. Description of the Related Art

In a communication system, it is important for a receiver to synchronize to the transmitter so that messages can successfully be exchanged between the transmitter and the receiver. In a radio communication system, it is particularly important that a receiver is tuned to the frequency of the transmitter for optimal reception.

A wireless local area network is a flexible data communication system implemented as an extension to or as an alternative for a wired local area network (LAN). WLAN systems transmit and receive data over the air using radio frequency or infrared technology to minimize the need for wired connections. Thus, WLAN systems combine data connectivity with user mobility.

Most WLAN systems use spread spectrum technology, a wide-band radio frequency technique developed for use in reliable and secure communication systems. The spread spectrum technology is designed to trade-off band-width efficiency for reliability, integrity and security. Two types of spread spectrum radio systems are frequently used: frequency hopping and direct sequence systems.

The standard defining and governing of wireless local area networks that operate in the 2.4 GHz spectrum is the IEEE 802.11 standard. To allow higher data rate transmissions, the standard was extended to the 802.11b standard, that allows data rates of 5.5 and 11 Mbps in the 2.4 GHz spectrum. This extension is backwards compatible.

The standards for WLAN systems using direct sequence spread spectrum techniques employ a training preamble to train the receiver to the transmitter. Each transmitted data message comprises an initial training preamble followed by a data field. The preamble includes a sync field to ensure that the receiver can perform the necessary operations for synchronization. For the preamble length, two options have been defined, namely a long and a short preamble. All compliant 802.11b systems have to support the long preamble. The short preamble option is provided in the standard to improve the efficiency of the networks throughput when transmitting special data such as voice and video. The synchronization field of a preamble consists of 128 bits for a long preamble and 56 bits for a short preamble.

A receiver detects the synchronization symbols and aligns the receivers internal clock to the symbols in the synchronization field in order to establish a fixed reference timeframe with which to interpret the fields in the transmission frame structure following the preamble. The preamble, including the synchronization field, is transmitted at the start of every message (data packet).

In WLAN systems, as well as in other spread spectrum communication systems, the signal on its way from the transmitter to the receiver experiences several distortions. A frequency or phase error may result from a frequency or phase offset of the radio frequency oscillators at the transmitter and the receiver. The oscillators may further provide different frequencies due to manufacturing imperfections, different temperatures, etc. which result in a frequency drift off the baseband signal. It may be therefore the task of any synchronization unit within the receiver to perform an error correction.

Turning now to FIG. 1, a frequency synchronization of a conventional data communication receiver is schematically shown that comprises a frequency error correction 100 and a subsequent phase error correction 110. The frequency error correction 100 is performed to compensate for the frequency difference, and the phase error correction 110 will then compensate for the residual phase error. Thus, the phase error corrector 110 has the task to remove the phase-offset remaining on the data-path signal, such that a coherent reception is enabled. This minimizes the probability of demodulation errors.

Frequency error correction units in receivers still have a number of disadvantages. One problem is that frequency error correction units need to perform a time-consuming number of iterated steps to achieve a frequency synchronization. If a frequency error correction procedure is repeatedly performed in a feedback loop, a first frequency error correction, therefore, is only possible after completing the feedback loop.

Another problem may be that the conventional adjustment processes may sometimes not be performed with sufficient phase or frequency resolution, and are restricted in use by the individual capabilities of the respective hardware implementation.

SUMMARY OF THE INVENTION

An improved receiver, integrated circuit chip and operation method are provided that may allow for a frequency error correction in a simple and less complex implementation, and improving correction precision and reliability.

In one embodiment, there is provided a method of correcting a frequency error in a data communication receiver. The method comprises obtaining an initial frequency error estimate in a first frequency error correction phase, compensating the frequency error in a second frequency error correction phase starting from the initial frequency error estimate, and refining the compensated frequency error in a third frequency error correction phase that uses a result of the second phase.

In a further embodiment, there is provided a method of operating a data communication receiver. The method comprises generating a frequency approximation value based on the frequency error estimate, starting a channel estimation process that uses the generated frequency approximation value, refining the generated frequency approximation value, and compensating a frequency error using the refined frequency approximation value.

In another embodiment, there is provided a receiver in a data communication system. The receiver comprises a frequency error correction unit that is capable of being operated in at least three frequency error correction phases. The frequency error correction unit is connected to receive an initial frequency error estimate in a first frequency correction phase, and is adapted to compensate the frequency error in a second frequency error correction phase starting from the initial frequency error estimate. The frequency error correction unit is further adapted to refine the compensated frequency error in a third frequency correction phase that uses a result of the second phase.

In still a further embodiment, there is provided a receiver in a data communication system. The receiver comprises a frequency error correction unit that is adapted to generate a frequency approximation value based on a frequency error estimate, and to start a channel estimation process that uses the generated frequency approximation value. The frequency error correction unit is further adapted to refine the generated frequency approximation value, and to compensate a frequency error using the refined frequency approximation value.

In yet another embodiment, there is provided a WLAN receiver that comprises a frequency error correction module for correcting a frequency error of a signal received by the WLAN receiver. The frequency error correction module comprises a multiplier that is connected for multiplying a frequency error signal with one of at least two loop filter constants, wherein the one loop filter constant is selected dependent on a preamble type. The frequency error correction module further comprises an integration register that is connected to an adder. The integration register is adapted to store an output of the adder. The adder is connected to receive either a product from the multiplier or preamble detection initialization data.

The frequency error correction module further comprises an output register that is connected to the adder and to the integration register.

In a further embodiment, an integrated circuit chip for use in a data communication receiver is provided. The integrated circuit chip comprises a frequency error correction circuit that is capable of being operated in at least three frequency error correction phases. The frequency error correction circuit is connected to receive an initial frequency error estimate in a first frequency error correction phase. The frequency error correction circuit is adapted to compensate the frequency error in a second frequency error correction phase starting from the initial frequency error estimate, and to refine the compensated frequency error in a third frequency error correction phase using a result of the second phase.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following, and more particular description of the invention as illustrated in the accompanying drawings, wherein.

DETAILED DESCRIPTION OF THE INVENTION

The illustrative embodiments of the present invention will be described with reference to the figure drawings, wherein like elements and structures are indicated with like reference numbers.

Figure 1:
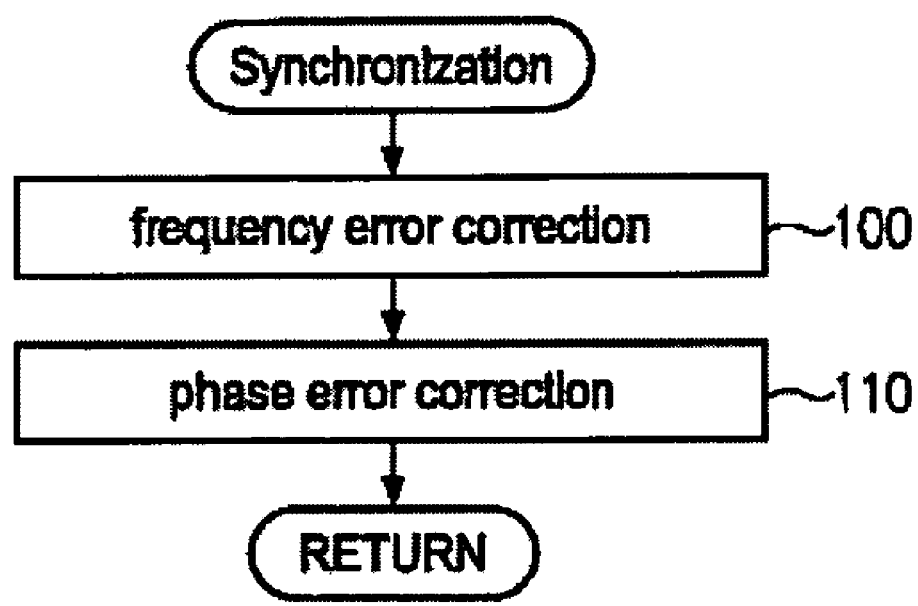
FIG. 1 is a flow chart illustrating a frequency error correction procedure of a conventional data communication receiver.
Figure 2:
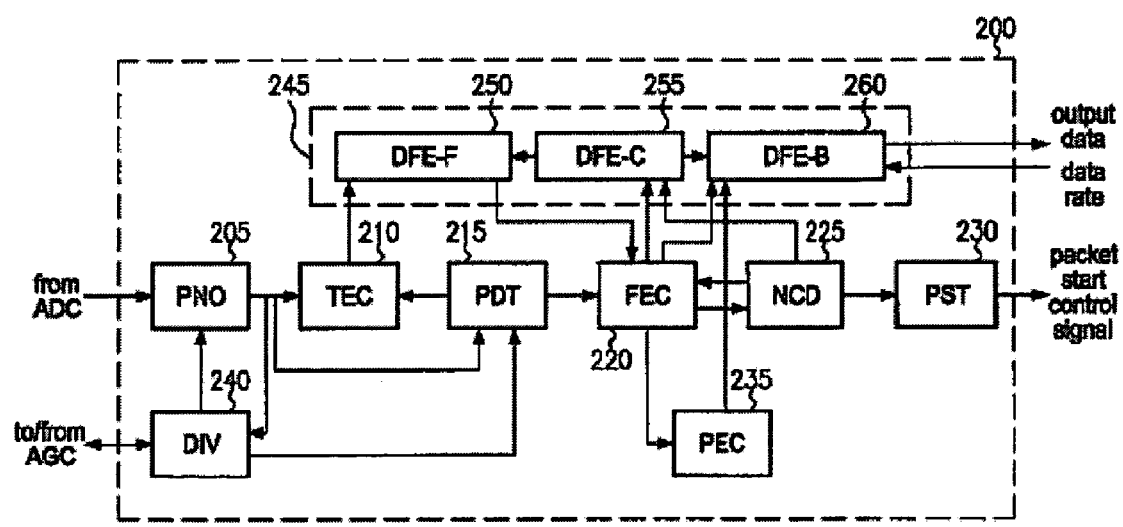
FIG. 2 is a block diagram illustrating the components of a synchronization circuit of a WLAN receiver according to an embodiment.

Referring now to the drawings, in particular to FIG. 2 which illustrates the components of a WLAN receiver according to an embodiment, the receiver comprises a synchronization baseband part 200 that is connected to a radio frequency part. The radio frequency part may be an analog circuit that receives an analog signal and provides a digitized representation thereof to the baseband part 200. Moreover, the radio frequency part may perform an automatic gain control to control the amplification gain dependent on the received signals power or strength. The automatic gain controller is located in the analog radio frequency part and interchanges control signals with the digital circuitry of the baseband part 200.

The baseband part 200 of the WLAN receiver of the present embodiment shown in FIG. 2 comprises a number of units that are interconnected to form a data path. That is, the baseband part 200 receives the digitized input signal from the radio frequency part and generates output data that is to be demodulated, decoded and descrambled for further processing.

When receiving the digitized input signal in the baseband part 200, the power normalization (PNO) is performed in unit 205 to normalize the power of the input signal. The power normalization may be performed under control of a diversity selection (DIV) unit 240 that controls antenna diversity and which is connected to an automatic gain controller of the radio frequency part. For performing the diversity selection, the diversity selection unit 240 receives the normalized signal from the power normalization unit 205.

The diversity selection unit 240 may further provide a-control signal to a preamble detection (PDT) unit 215. The preamble detection unit 215 receives the normalized signal from the power normalization unit 205 and detects a preamble in this signal. A preamble is a special signal pattern used for synchronization acquisition.

As may be seen from FIG. 2, the preamble detection unit 215 provides output signals to a timing error correction (TEC) unit 210 and a frequency error correction (FEC) unit 220. These units are used to detect and correct timing errors and frequency errors, respectively.

As mentioned above, the preamble detection unit 215 receives the normalized input signal from the power normalization unit 205. The feedforward filter (DFE-F) 250 receives the output signal of the timing error correction unit 210 and filters this signal under control of the decision feedback equalization controller (DFE-C) 255. The filtered signal is fed through the frequency error correction unit 220.

As can further be seen from FIG. 2, the decision feedback equalization controller 255 may operate dependent on certain input signals that are received from the frequency error correction unit 220 and/or a non-coherent detection (NCD) unit 225. The non-coherent detection unit 225 may operate independently from any phase offset.

The phase error correction unit 235 that provides a signal to the feedback filter 260 of the decision feedback equalizer 245 receives an output signal from the frequency error correction unit 220. The frequency control and the phase control is done in two separate stages, and the phase error correction is performed based on a signal that has previously been corrected with respect to a frequency error.

The feedback filter 260 filters the data to provide output data, and it is controlled by the decision feedback equalization controller 255. Further, the feedback filter 260 may receive a signal which is indicative of the data rate.

Moreover, there is provided a packet start detection (PSD) unit 230 that detects the start of frame delimiter (SFD) portion in the received data signal to generate a packet start control signal. For this purpose, the packet start detection unit 230 receives input from the non-coherent detection unit 225.

Figure 3:
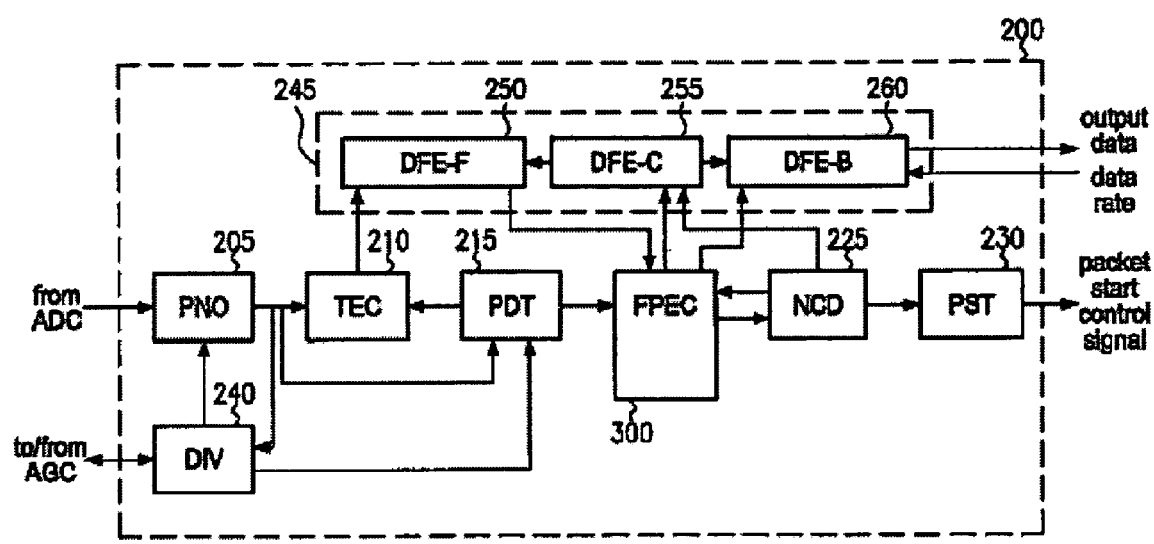
FIG. 3 is a block diagram illustrating the components of a synchronization circuit of a WLAN receiver according to another embodiment.

Turning now to the block diagram of FIG. 3, the components of a WLAN receiver are illustrated that comprises a synchronization baseband part 200 according to another embodiment. The present baseband part 200 differs from that shown in FIG. 2 mainly in the frequency/phase error correction unit 300. When comparing FIGS. 2 and 3, it is apparent that the frequency error correction unit 220 and phase error correction unit 235 of the synchronization baseband part 200 of FIG. 2 are removed and replaced by the frequency/phase error correction unit 300. Further, it can be seen that the frequency/phase error correction unit 300 is connected in a similar manner as the frequency error correction unit 220 and phase error correction unit 235 depicted in FIG. 2. A detailed description of the frequency/phase error correction unit 300 of FIG. 3 will follow below.

Figure 4:
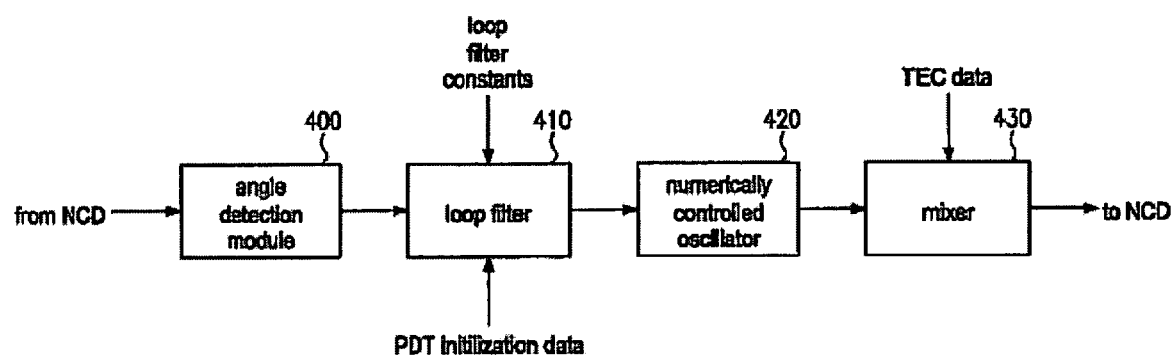
FIG. 4 illustrates a loop filter circuit according to an embodiment.

Referring to FIG. 4, a loop filter circuit is shown that may be used in the above-mentioned frequency error correction unit 220 of FIG. 2 according to one embodiment, and may further be used in the frequency/phase error correction unit 300 of FIG. 3 according to another embodiment.

The loop filter circuit comprises an angle detection module 400, a loop filter 410, a numerically controlled oscillator 420 and a mixer 430. The angle detection module 400 is connected to the non-coherent detection unit 225 of the synchronization baseband part 200. The angle detection module 400 is further connected to the loop filter 410. The loop filter 410 receives preamble detection initializing data and loop filter constants for filtering the signal delivered by the angle detection module 400. The loop filter 410 transmits the filtering result to the numerically controlled oscillator 420, and this input signal of the numerically controlled oscillator 420 that is received from the loop filter 410, is forwarded to the mixer 430. The mixer 430 is connected to the timing error correction unit 210 to receive timing error data, and the mixer 430 is further connected to the non-coherent detection unit 225 to complete the frequency loop to correct the detected frequency errors.

Figure 5:
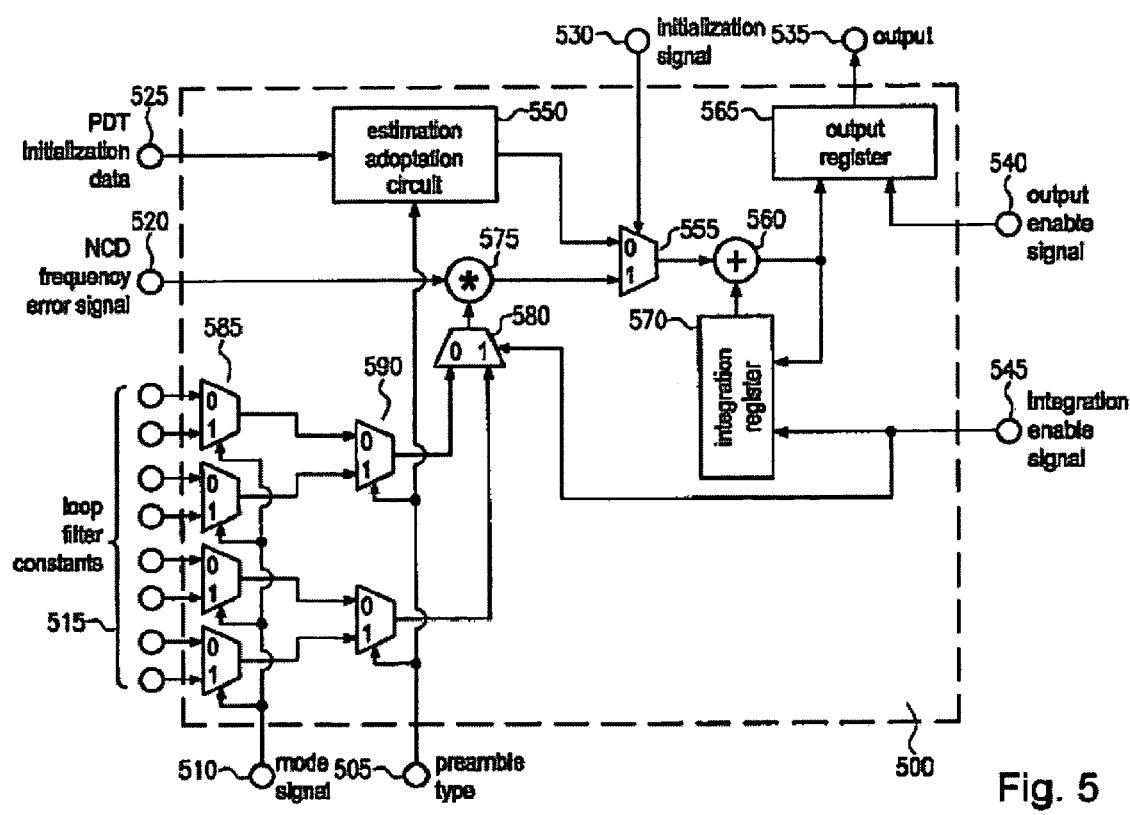
FIG. 5 is a block diagram of a loop filter according to an embodiment.

Turning now to FIG. 5, a more detailed block diagram of the loop filter 410, 500 is depicted according to an embodiment. The loop filter 500 may be used in the above-described loop filter circuit of the FIG. 4 and may be implemented in the frequency error correction unit 220 of FIG. 2, and/or in the frequency/phase error correction unit 300 of FIG. 3.

The loop filter 500 of FIG. 5 comprises various control terminals (505, 510, 530, 535, 540, 545) to receive several control signals from the above-described interconnected units. Further, the loop filter 500 receives preamble detection initialization data from the preamble detection unit 215 at an input terminal 525. The preamble detection initialization data comprises a frequency error estimate, that is delivered to an estimate adaptation circuit 550 of the loop filter 500.

The estimate adaptation circuit 550 adapts the incoming frequency error estimate according to a short or long preamble type. For this purpose, the estimate adaptation circuit 550 may be controlled by a preamble type signal that is applied to the control terminal 505. The adapted frequency error estimate is forwarded to a multiplexer 555.

The multiplexer 555 is adapted to select between the above-mentioned adapted frequency error estimate and a product delivered by a multiplier 575. The multiplexer 555 may be controlled by an initialization signal delivered to the terminal 530.

The multiplier 575 is connected to a frequency error signal input terminal 520 which receives a frequency error signal from the non-coherent detection unit 225. The multiplier 575 multiplies the frequency error signal with a loop filter constant to generate the product to be delivered to the multiplexer 555.

The loop filter constant is selected out of a plurality of loop filter constants provided at terminals 515. The selection of the loop filter constants is controlled by a mode signal applied to a mode signal terminal 510, and a preamble type applied to the preamble type terminal 505. Selecting a loop filter constant comprises switching a first multiplexer stage 585 depending on the applied mode signal, and further switching a second multiplexer stage 590 depending on the applied preamble type. The mode signal may be a control signal to set the loop filter 500 to different modes. The preamble type signal may indicate either a long or a short preamble. An integration enable signal controls another multiplexer 580 that provides the selected loop filter constant to the multiplier 575.

As explained above, the multiplier 575 multiplies the applied frequency error signal with the selected loop filter constant. The result of the multiplication is delivered to the multiplexer 555 that is connected to an adder 560. The adder 560 is further connected to an integration register 570 to receive updated frequency error integration values. The adder 560 generates a sum of either the adapted frequency error estimate received from circuit 550 or the multiplication result, and a content of the integration register 570. The generated sum is delivered in a loop configuration to the integration register 570 to update the content of the integration register 570, and further delivered to an output register 565. The output register 565 is connected to an output terminal 535 to provide the content of the output register to other units, wherein the outputting of signals via the output register 565 is controlled by an output enable signal that is applied to the output enable signal terminal 540.

Similarly, the integration register 570 is controlled by an integration enable signal that is delivered to an integration enable signal terminal 545. As mentioned above, the integration enable signal applied to the integration enable signal terminal 545 further controls the above-mentioned multiplexer 580.

Figure 6:
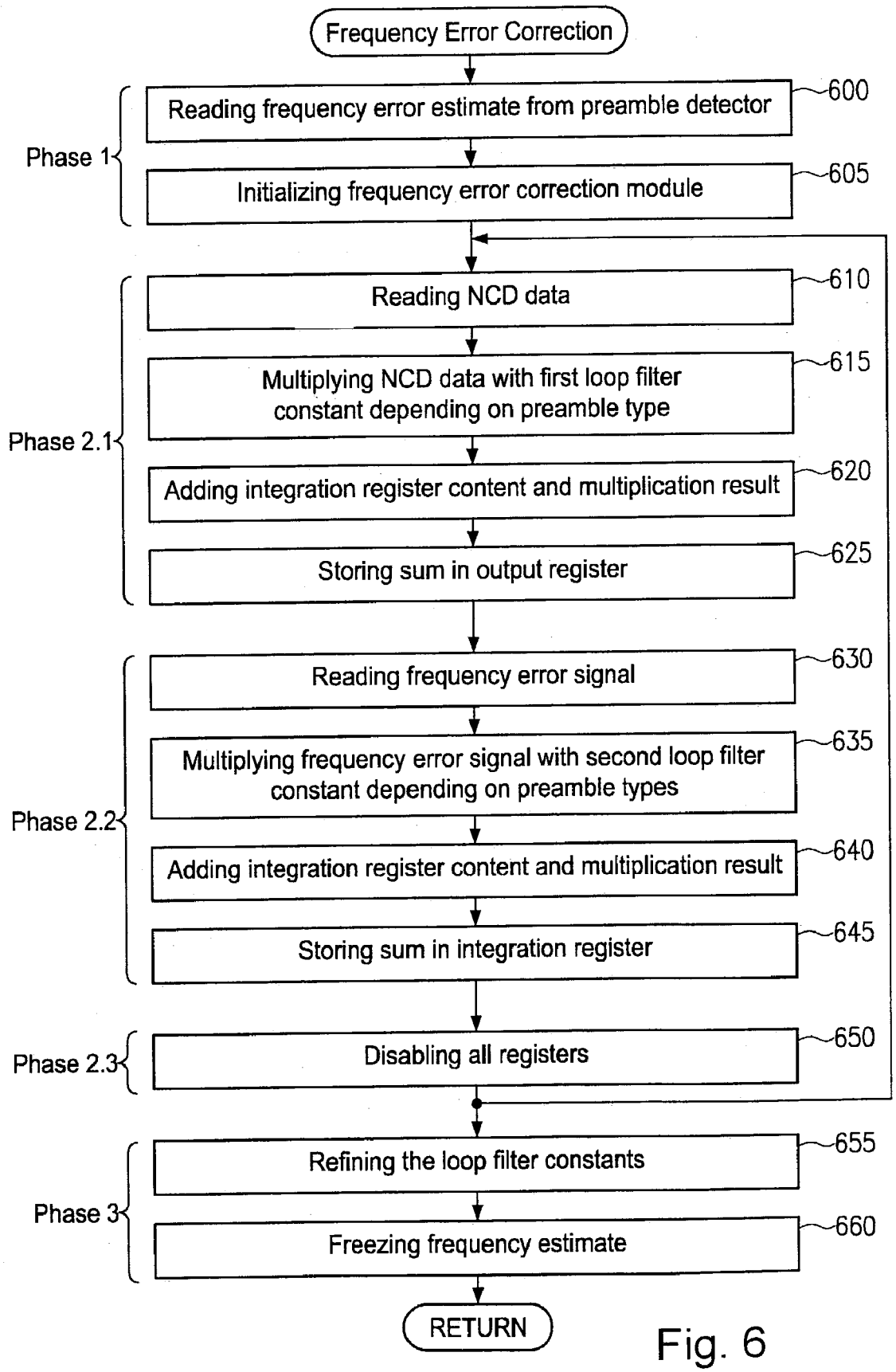
FIG. 6 is a flow chart illustrating the process of performing the frequency error correction according to an embodiment.

Referring now to FIG. 6, a process of a frequency error correction according to an embodiment is shown in a flow chart. As apparent from the flow chart, the process comprises several different frequency error correction phases, wherein each phase comprises different steps.

The first phase is an initialization phase that comprises reading the frequency error estimate from the preamble detector 215 in step 600, and initializing the frequency error correction module in step 605. After the first phase of the frequency error correction process, the process continues to perform the second phase.

The frequency error correction loop is started in the second phase with a selected loop filter constant allowing fast acquisition to be able to start a channel estimation as soon as possible.

The second phase comprises three sub-phases. The first sub-phase of the second phase starts with reading NCD (non-coherent detection) data in step 610. After reading the NCD data, the NCD data is multiplied in step 615 with a first loop filter constant depending on a preamble type. The following step 620 comprises adding the integration register content and the multiplication result. The resulting sum is stored in the output register in step 625. This first sub-phase of the second phase could be seen as a first approximation to a channel frequency based on a frequency error estimate.

After the first sub-phase, there will be performed the second sub-phase of the second phase. The second sub-phase comprises reading the frequency error signal from terminal 520 in step 630. In step 635, the frequency error signal is multiplied with a second loop filter constant depending on a preamble type. The multiplication result generated in step 635 is added to the integration register content in step 640. The resulting sum of step 640 is stored in the integration register 570 in step 645. This second sub-phase of the second phase could be seen as a phase for preparing for a refinement of the frequency approximation generated in the first sub-phase of the second phase. As mentioned above, the second phase has three sub-phases, and the third sub-phase of the second phase comprises disabling all registers in step 650.

In the present embodiment, the second phase of the frequency error correction process may be periodically iterated as long as the second phase is active. In another embodiment, the second phase of the frequency error correction process may be active as long as a frequency error value exceeds a predefined frequency error limit. In a further embodiment, the second phase may be active for a predefined period of time.

The third phase of the frequency error correction process comprises a step 655 of refining the loop filter constants for achieving higher precision of a frequency offset compensation until the frequency estimate is frozen in step 660.

In an embodiment, the third phase differs from the second phase only with respect to the applied loop filter constant. That is, the process performed in step 655 may comprise a periodical iteration of three sub-phases such as in the second phase. In another embodiment, the refinement may be performed without any iteration. Given the three-phase approach of FIG. 6 it is to be noted that the loop filter 500 of FIG. 5 may operate in each of these phases in a different manner. For instance, the estimate adaptation circuit 550 may be operated in the first phase only and may be deactivated later.

Further, it is to be noted that the above-explained flow chart of FIG. 6 illustrates one embodiment of the frequency error correction process. In the following, further flow charts will be presented illustrating the frequency error correction process according to another embodiment.

Figure 7:
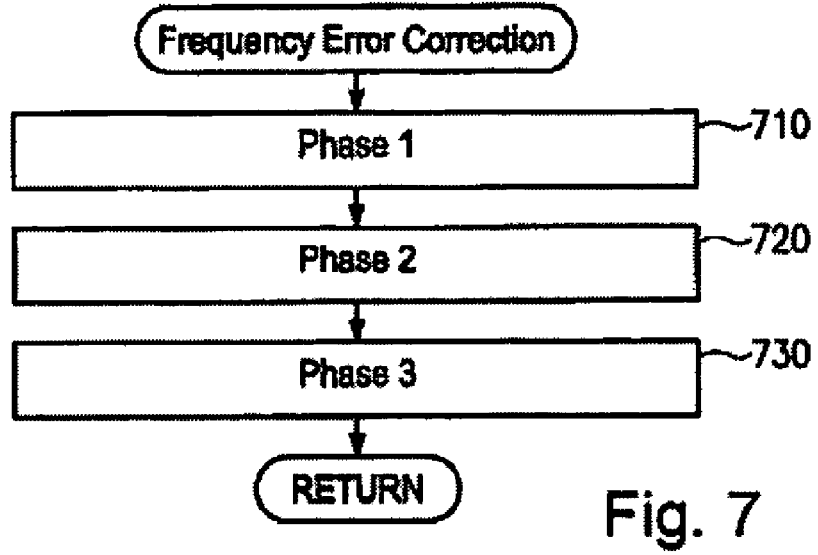
FIG. 7 is a flow chart illustrating the concept of performing the frequency error correction.

Similar to FIG. 6, the frequency error correction process of FIG. 7 is divided in three phases 710, 720, 730 according to the present embodiment. The second phase 720 and the third phase 730 may be each performed for a given period which is a number of symbols. The period of the second phase 720 may differ from the period of the third phase 730. Both periods may be freely configurable, e.g., with respect to the actual implementation and the available synchronization period.

Figure 8:
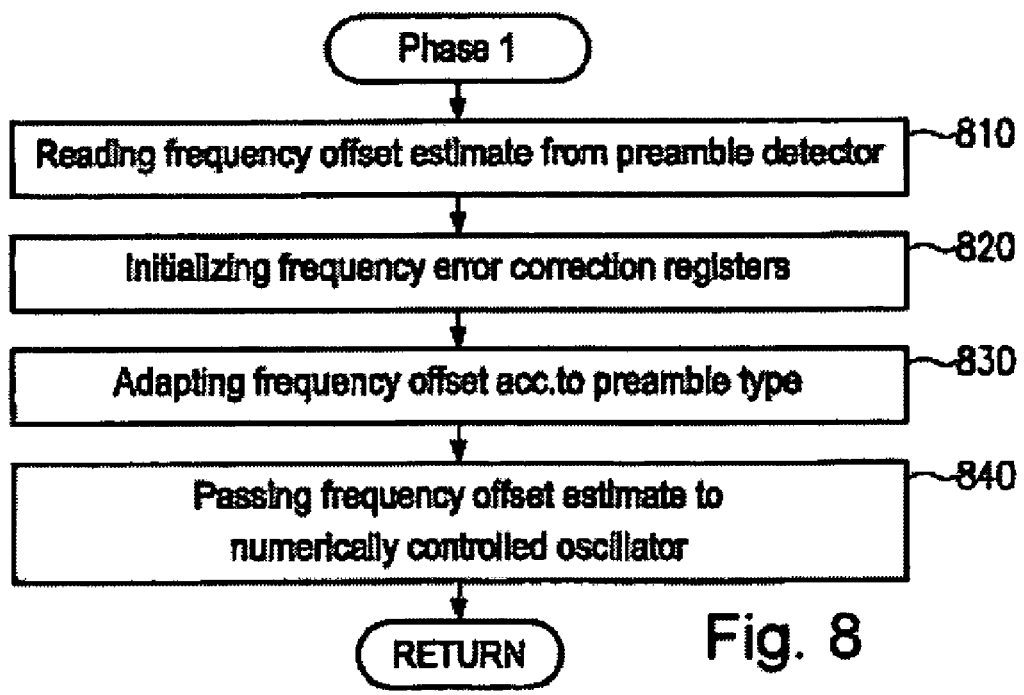
FIG. 8 is a flow chart illustrating the first phase of the frequency error correction process of FIG. 7 according to another embodiment.

Turning now to FIG. 8, phase 1 of the frequency error correction process shown in FIG. 7 is a phase where a frequency offset estimate is read from the preamble detection unit 215 in step 810, and frequency error correction registers 565, 570 are initialized in step 820. Phase 1 further comprises step 830, wherein the frequency offset is adapted according to the preamble type delivered from the preamble detection unit 215. In step 840, the result of the adaptation is passed to the numerically controlled oscillator 420 that is part of the loop filter circuit shown in FIG. 4.

Figure 9:
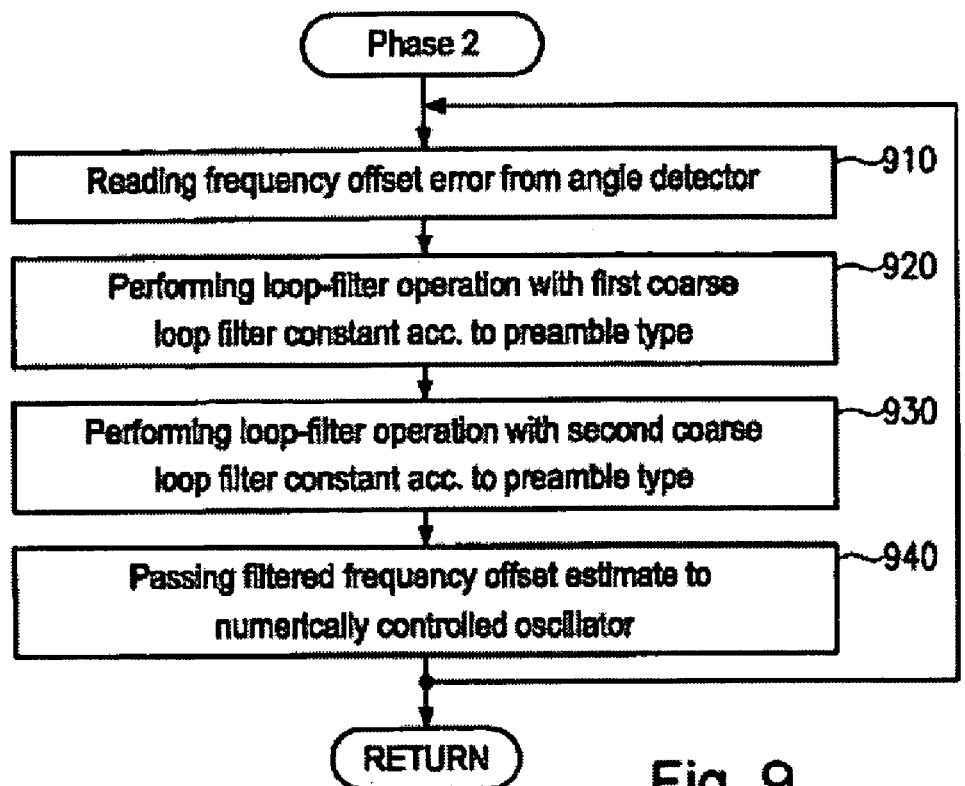
FIG. 9 is a flow chart illustrating the second phase of the frequency error correction process of FIG. 7 according to another embodiment.

Turning now to FIG. 9, phase 2 of the frequency error correction process is shown. The phase may be intended to apply loop filter constants for fast, but coarse adaptation to the real frequency offset. For this purpose, a frequency offset error is read from the angle detector 400 in step 910, and a loop filter operation is performed in step 920 with a first coarse loop filter constant according to the preamble type. The frequency offset error is the measured error due to feedback operation of the system. A further approach to a real frequency offset may be achieved in step 930, wherein another loop filter operation is performed with a second coarse loop filter constant according to the preamble type.

The first and the second coarse loop filter constants used in steps 920 and 930 are second order low pass loop filters, and they are free for configuration with respect to the desired filter properties.

Step 930 results in a filtered frequency offset estimate that is then passed in step 940 to the numerically controlled oscillator 420 of the loop filter circuit of FIG. 4. The above-described steps 910, 920, 930, 940 may be periodically iterated for a number of symbols, or until a desired approach to the real frequency offset is achieved.

Figure 10:
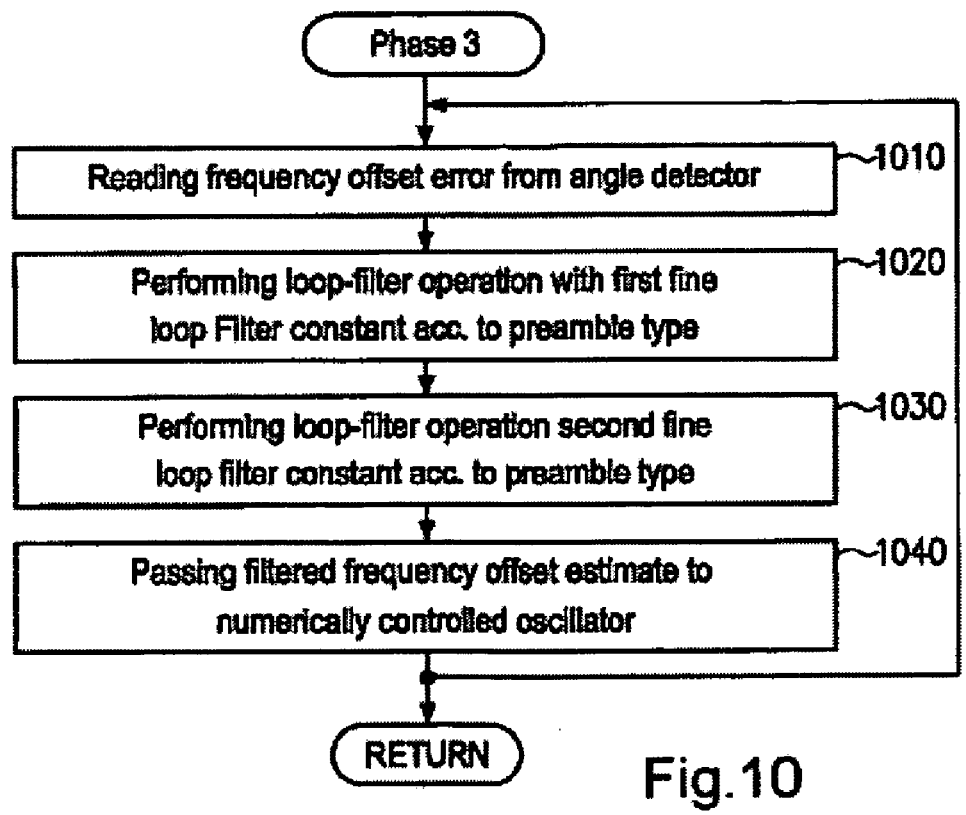
FIG. 10 is a flow chart illustrating the third phase of the frequency error correction process of FIG. 7 according to another embodiment.

Turning now to FIG. 10, phase 3 of the frequency error correction process is shown. The method includes reading a frequency offset error from an angle detector (step 1010). Phase 2 and phase 3 differ mainly in the selection of the loop filter constants used in steps 1020 and 1030, wherein phase 3 uses first and second fine loop filter constants for increasing precision of the frequency-offset estimate. As with Phase 2, phase 3 also includes passing a filtered frequency offset estimate to the numerically controlled oscillator (step 1040).

The first and the second fine loop filter constants are used in step 1020 and 1030 when performing a loop filter operation. The first and the second fine loop filter constants are second order low pass loop filters, and they are free for configuration with respect to the desired filter properties. The phase may also be periodically iterated as long as it is active. Phase 3 in fact increases the averaging effect of the loop filter 410 of the loop filter circuit shown in FIG. 4.

Figure 11:
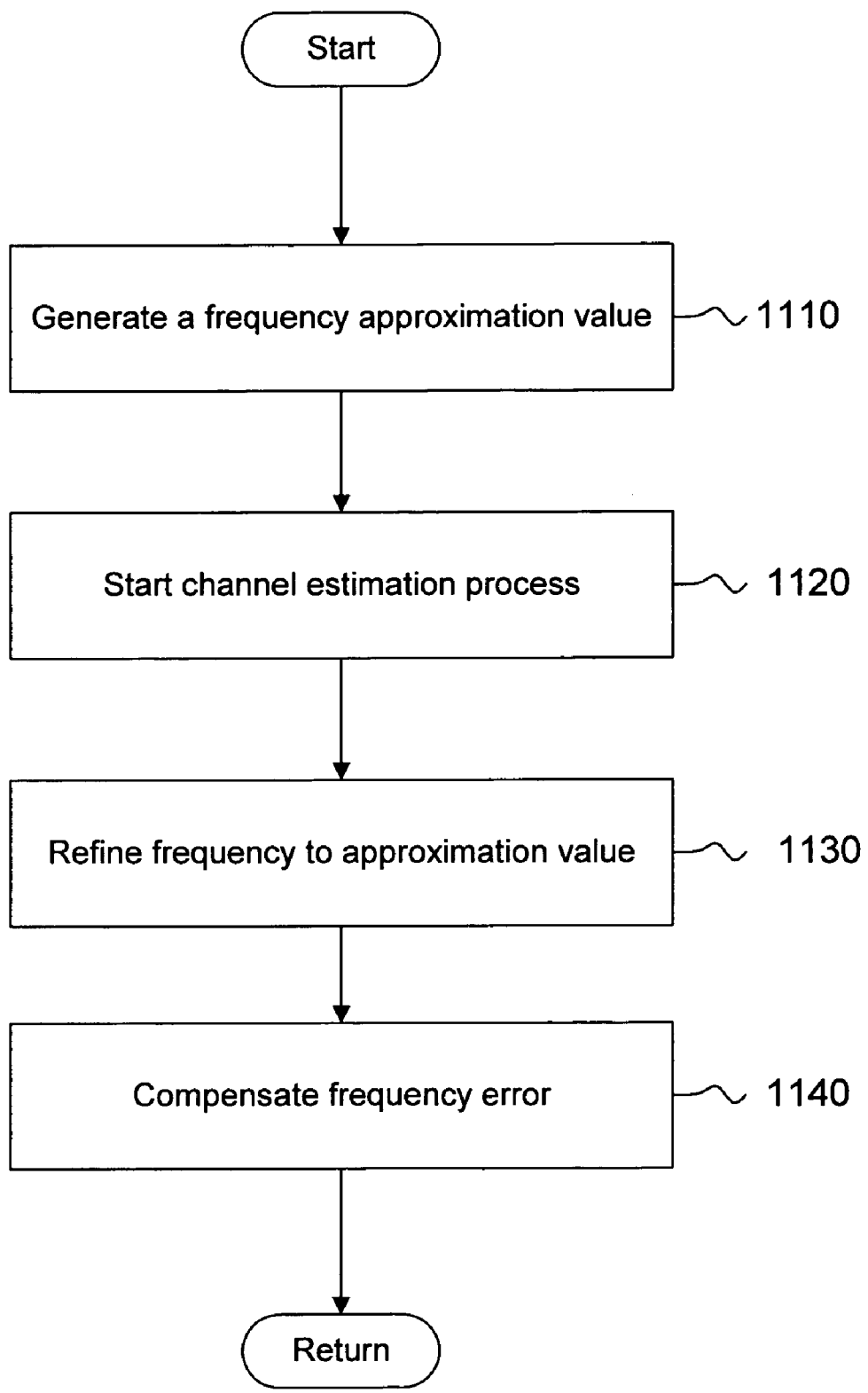
FIG. 11 is a flow chart illusrating a method of operating a communications reciever, the method including the compensation of a frenquency error.

FIG. 11 illustrates a method of operating a data communication receiver. The method comprises generating a frequency approximation value (step 1110) based on the frequency error estimate, starting a channel estimation process (step 1120) that uses the generated frequency approximation value (step 1130), refining the generated frequency approximation value, and compensating a frequency error (step 1140) using the refined frequency approximation value.

As apparent from the foregoing description, all of the embodiments as described may advantageously provide high reliability, high precision and increased operating speed.

The above described technique offers a frequency error correction process in three different tracking phases. It is to be noted that in a further embodiment, the first phase may be skipped to actually achieve a two-phase process. The fact, that the second phase starts the frequency error correction loop with a first loop filter constant may be advantageous for allowing fast acquisition to be able to start a channel estimation immediately. The channel estimation may be therefore improved since it may be based on roughly frequency compensated data-path signals as soon as possible.

The frequency error correction process performed in two or three different phases offers a further advantage because of the fact that it may be no longer necessary to have all time consuming frequency synchronization steps completed before obtaining a first frequency error estimate.

The arrangements may further have the advantage to allow for reducing the total number of component parts.

Moreover, the manufacturing is optimized and therefore, the above described embodiments effect lower production costs.

Since the performance of any frequency error correction in data communication receivers is strongly a trade off between tracking accuracy and acquisition speed, the embodiments advantageously allow for optimizing the correction performance.

In the embodiment, a three-phase technique is described where firstly, a rough estimate is taken over from the preamble detection unit 215 to initialize the frequency error correction. Secondly, the frequency error correction loop filter is started with loose loop filter constants, allowing fast acquisition to be able to start a channel estimation as soon as possible. In the third phase, the frequency error correction loop filter constants are refined for higher precision of frequency offset compensation in the datapath until the frequency estimate is frozen before starting the phase error correction.

While not limited to WLAN receivers, the embodiments may be advantageously used in IEEE 802.11b compliant systems.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order not to unnecessarily obscure the invention described herein. Accordingly, it is to be understood that the invention is not to be limited by the specific illustrative embodiments, but only by the scope of the appended claims.

What is claimed is:

1. A method of correcting a frequency error in a data communication receiver, the method comprising:
    obtaining an initial frequency error estimate in a first frequency error correction phase;
    compensating the frequency error in a second frequency error correction phase starting from said initial frequency error estimate,
    refining the compensated frequency error in a third frequency error correction phase using a result of said second phase, wherein the second phase comprises a first sub-phase of:
        selecting a loop filter constant based on a preamble type,
        multiplying a frequency error signal with the selected loop filter constant,
        adding the product to a content of a first register, and storing the sum in a second register.

2. The method of claim 1, wherein said first phase comprises:
    receiving said initial frequency error estimate from a preamble detection unit of said data communication receiver.

3. The method of claim 2, wherein said step of receiving said initial frequency error estimate comprises:
    receiving a signal indicating a preamble type.

4. The method of claim 1, wherein said first phase comprises:
    writing said initial frequency error estimate to an output register of a frequency error correction unit of said data communication receiver.

5. The method of claim 1, wherein said first phase comprises:
    writing said initial frequency error estimate to an integration register of a frequency error correction unit of said data communication receiver, said integration register being connected to store updated frequency error integration values in said second phase.

6. The method of claim 5, wherein said first phase further comprises:
    writing said initial frequency error estimate to an output register of said frequency error correction unit of said data communication receiver.

7. The method of claim 1, wherein said second phase comprises: receiving a frequency error signal generated by a non-coherent detection unit of said data communication receiver.

8. The method of claim 7, wherein said second phase further comprises:
    generating angle detection data based on said frequency error signal.

9. The method of claim 1, wherein said second phase further comprises a second sub-phase of:
    selecting a loop filter constant based on a preamble type,
    multiplying a frequency error signal with the selected loop filter constant,
    adding the product to a content of said first register, and storing the sum in said first register.

10. The method of claim 9, wherein said second phase further comprises a third sub-phase of:
    disabling at least one of said first and second registers.

11. The method of claim 10, wherein said second phase comprises a periodical iteration of said sub-phases.

12. The method of claim 1, wherein said third phase comprises:
    receiving a frequency error signal generated by a non-coherent detection unit of said data communication receiver.

13. The method of claim 12, wherein said third phase further comprises:
    generating angle detection data based on said frequency error signal.

14. The method of claim 1, wherein said third phase comprises a first sub-phase of:
    selecting a loop filter constant based on a preamble type,
    multiplying a frequency error signal with the selected loop filter constant,
    adding the product to a content of a first register, and storing the sum in a second register.

15. The method of claim 14, wherein said third phase further comprises a second sub-phase of:
    selecting a loop filter constant based on a preamble type,
    multiplying a frequency error signal with the selected loop filter constant,
    adding the product to a content of said first register, and storing the sum in said first register.

16. The method of claim 15, wherein said third phase further comprises a third sub-phase of:
disabling at least one of said first and second registers.

17. The method of claim 16, wherein said third phase comprises a periodical iteration of said sub-phases.

18. The method of claim 1, wherein said second and third phase comprise operating a loop filter, and said third phase differs from said second phase only with respect to the loop filter constants.

19. The method of claim 1, wherein said data communication receiver is a WLAN (Wireless Local Area Network) receiver.

20. The method of claim 1, being performed in a frequency tracking process.

21. A method of operating a data communication receiver, the method comprising:
generating a frequency approximation value based on a frequency error estimate;
starting a channel estimation process using said generated frequency approximation value;
refining said generated frequency approximation value; and
compensating a frequency error using the refined frequency approximation value;
wherein said refining further comprises:
selecting a loop filter constant based on a preamble type,
multiplying a frequency error signal with the selected loop filter constant,
adding the product to a content of a first register, and writing the sum in a second register.

22. The method of claim 21, wherein said generating a frequency approximation value comprising:
operating a loop filter using at least one loop filter constant selected depending on a preamble type.

23. The method of claim 21, wherein said step of generating a frequency approximation value comprises:
writing a frequency estimate to an output register of said data communication receiver.

24. The method of claim 21, wherein said generating a first frequency approximation comprises writing a frequency estimate to an integration register of said data communication receiver.

25. The method of claim 21, wherein said step of refining comprises:
operating a loop filter based on at least one loop filter constant depending on a result of said generated frequency approximation value.

26. The method of claim 21, wherein said step of refining further comprises:
selecting another loop filter constant based on the preamble type,
multiplying a frequency error signal with the selected another loop filter constant,
adding the product to a content of said first register, and storing the sum in said first register.

27. A receiver in a data communication system, the receiver comprising:
a frequency error correction unit including:
an angle detection module;
a loop filter coupled to the angle detection module, wherein the loop filter is coupled to receive a signal from the angle detection module and is further coupled to receive loop filter constants for filtering a signal received from the angle detection module; and
a numerically controlled oscillator coupled to receive a filtered signal from the loop filter;
wherein the frequency error correction unit is capable of being operated in at least three frequency error correction phases, the frequency error correction unit being connected to receive an initial frequency error estimate in a first frequency error correction phase, the frequency error correction unit being adapted to compensate the frequency error in a second frequency error correction phase starting from said initial frequency error estimate, and to refine the compensated frequency error in a third frequency error correction phase using a result of said second phase, and wherein said second phase has a first sub-phase, and said frequency error correction unit is adapted, in said first sub-phase, to select a loop filter constant based on a preamble type, and to multiply a frequency error signal with the selected loop filter constant, the frequency error correction unit being further adapted to add the product to a content of a first register, and to store the sum in a second register.

28. The receiver of claim 27, further comprising a preamble detection unit, wherein said frequency error correction unit is connected to receive said initial frequency error estimate from said preamble detection unit.

29. The receiver of claim 28, wherein said frequency error correction unit is further connected to receive a signal indicating a preamble type from said preamble detection unit.

30. The receiver of claim 27, wherein said frequency error correction unit comprises an output register, wherein said frequency error correction unit is capable of writing said initial frequency error estimate to said output register.

31. The receiver of claim 27, wherein said frequency error correction unit comprises an integration register connected to store updated frequency error integration values in said second phase, wherein said frequency error correction unit is adapted to write said initial frequency error estimate to said integration register.

32. The receiver of claim 31, wherein said frequency error correction unit comprises an output register, wherein said frequency error correction unit is adapted to write said initial frequency error estimate to said output register.

33. The receiver of claim 27, further comprising a non-coherent detection unit, wherein said frequency error correction unit is connected to receive a frequency error signal generated by said non-coherent detection unit.

34. The receiver of claim 33, wherein said angle detection module of said frequency error correction unit is adapted to generate angle detection data based on said frequency error signal.

35. The receiver of claim 27, wherein said second phase has a second sub-phase, and said frequency error correction unit is further adapted, in said second sub-phase, to select a loop filter constant based on a preamble type, and to multiply a frequency error signal with the selected loop filter constant, the frequency error correction unit being further adapted to add the product to a content of said first register, and to store the sum in said first register.

36. The receiver of claim 35, wherein said second phase has a third sub-phase, and said frequency error correction unit is capable of disabling at least one of said first and second registers.

37. The receiver of claim 27, wherein said frequency error correction unit is adapted to periodically iterate in said second phase.

38. The receiver of claim 27, further comprising a non-coherent detection unit, wherein said frequency error correction unit is connected to receive a frequency error signal generated by said non-coherent detection unit.

39. The receiver of claim 38, wherein said frequency error correction unit is capable of generating angle detection data based on said frequency error signal.

40. The receiver of claim 27, wherein said third phase has a first sub-phase, and said frequency error correction unit is adapted, in said first sub-phase, to select a loop filter constant based on a preamble type, and to multiply a frequency error signal with the selected loop filter constant, the frequency error correction unit being further adapted to add the product to a content of a first register, and to store the sum in a second register.

41. The receiver of claim 40, wherein said third phase has a second sub-phase, and said frequency error correction unit is further adapted, in said second sub-phase, to select a loop filter constant based on a preamble type, and to multiply a frequency error signal with the selected loop filter constant, the frequency error correction unit being further adapted to add the product to a content of said first register, and to store the sum in said first register.

42. The receiver of claim 41, wherein said third phase has a third sub-phase, and said frequency error correction unit is capable of disabling at least one of said first and second registers.

43. The receiver of claim 27, wherein said frequency error correction unit is adapted to a periodically iterate in said third phase.

44. The receiver of claim 27, wherein said frequency error correction unit is capable of operating a loop filter in said second and third phases, and said third phase differs from said second phase only with respect to the loop filter constants.

45. The receiver of claim 27, being a WLAN (Wireless Local Area Network) receiver.

46. The receiver of claim 27, being adapted to perform said three phases in a frequency tracking process.

47. A receiver in a data communication system, the receiver comprising:
a frequency error correction unit including:
an angle detection module;
a loop filter coupled to the angle detection module, wherein the loop filter is coupled to receive a signal from the angle detection module and is further coupled to receive loop filter constants for filtering a signal received from the angle detection module; and
a numerically controlled oscillator coupled to receive a filtered signal from the loop filter;
wherein the frequency error correction unit is adapted to generate a frequency approximation value based on a frequency error estimate, and to start a channel estimation process using said generated frequency approximation value, said frequency error correction unit being further adapted to refine said generated frequency approximation value, and to compensate a frequency error using the refined frequency approximation value, and wherein said frequency error correction unit is adapted to select a loop filter constant based on a preamble type, and to multiply a frequency error signal with the selected loop filter constant, the frequency error correction unit being further adapted to add the product to a content of a first register, and to write the sum in a second register.

48. The receiver of claim 47, further comprising a loop filter, wherein said frequency error correction unit is capable of operating said loop filter using at least one loop filter constant selected depending on a preamble type.

49. The receiver of claim 47, further comprising an output register, wherein said frequency error correction unit is connected to write a frequency estimate to said output register.

50. The receiver of claim 47, further comprising an integration register, wherein said frequency error correction unit is connected to write a frequency estimate to said integration register.

51. The receiver of claim 47, further comprising a loop filter, wherein said frequency error correction unit is capable of operating said loop filter based on at least one loop filter constant depending on a result of said generated frequency approximation value.

52. The receiver of claim 47, wherein said frequency error correction unit is adapted to select another loop filter constant based on a preamble type, and to multiply a frequency error signal with the selected another loop filter constant, the frequency error correction unit being further adapted to add the product to a content of said first register, and to store the sum in said first register.

53. A WLAN (Wireless Local Area Network) receiver comprising a frequency error correction module for correcting a frequency error of a signal received by the WLAN receiver, said frequency error correction module comprising:
a multiplier connected for multiplying a frequency error signal with one of at least two loop filter constants, wherein said one loop filter constant is selected dependent on a preamble type;
an integration register connected to an adder, said integration register adapted to store an output of said adder, said adder being connected to receive either a product from said multiplier or preamble detection initialization data; and
an output register connected to said adder and to said integration register.

54. An integrated circuit chip for use in a data communication receiver, the integrated circuit chip comprising:
a frequency error correction including:
an angle detection module;
a loop filter coupled to the angle detection module, wherein the loop filter is coupled to receive a signal from the angle detection module and is further coupled to receive loop filter constants for filtering a signal received from the angle detection module; and
a numerically controlled oscillator coupled to receive a filtered signal from the loop filter;
wherein the frequency error correction unit is circuit capable of being operated in at least three frequency error correction phases, the frequency error correction circuit being connected to receive an initial frequency error estimate in a first frequency error correction phase, the frequency error correction circuit being adapted to compensate the frequency error in a second frequency error correction phase starting from said initial frequency error estimate, and refine the compensated frequency error in a third frequency error correction phase using a result of said second phase, and wherein said frequency error correction unit is adapted to select a loop filter constant based on a preamble type, and to multiply a frequency error signal with the selected loop filter constant, the frequency error correction unit being further adapted to add the product to a content of a first register, and to write the sum in a second register.

* * * * *